Patented Jan. 16, 1940

2,187,566

UNITED STATES PATENT OFFICE 2,187,566

PLASTICIZING NITROGENOUS RESINS

Herman A. Bruson, Philadelphia, Pa., assignor to The Resinous Products & Chemical Company, Philadelphia, Pa.

No Drawing. Application December 29, 1938, Serial No. 248,195

10 Claims. (Cl. 260—33)

This invention relates to a process for plasticizing resins of the urea-formaldehyde type and, more particularly, deals with a method for plasticizing the extremely brittle, hard, more or less heat-reactive forms of resins obtained from aldehydes and urea, dicyandiamide, thiourea, melamine, or other substituted ureas or substituted triazines which are known to give resins with formaldehyde, all of which resins initially contain methylol groups.

Although many substances have been proposed as plasticizers for urea-formaldehyde type resins, most of the substances proposed have been incompatible with these resins either in solutions or in the films of the resin, and have consequently exuded from the resin upon curing. Those which have been compatible with the resin have been either water-soluble, hygroscopic, or capable of being used in only small amounts.

According to this invention, a high degree of plastification of carbamide-aldehyde resins is obtained by incorporating therewith certain resinous or balsam-like condensation products of aliphatic nitropolyhydric alcohols and resin-forming polycarboxylic acids. These condensation products are obtained by heating reacting proportions of the nitropolyhydric alcohol and the polycarboxylic acid or its anhydride, at temperatures from about 125 to about 160° C., until water is no longer evolved or until a suitable degree of viscosity is attained.

The resinous condensates thus obtained are pale yellow to almost colorless substances which are insoluble in water, but are soluble in methanol, in resin solutions, or in resins containing free methylol groups such as are present in the methylol-ureas, or in related resins obtainable from formaldehyde and dicyandiamide, melamine, thiourea, etc. For this reason they can be incorporated with soluble condensation products of formaldehyde and urea, thiourea, melamine, dicyandiamide and other analogous resins of the urea-formaldehyde type or mixtures of these resins. All of these, in their soluble form, contain methylol groups attached to a nitrogen atom. Upon curing they give clear films or molded objects from which the plasticizer does not segregate and which are not affected by moisture.

The condensation product of a nitropolyhydric alcohol and a resin-forming polycarboxylic acid may be mixed with a solution of a urea-formaldehyde resin in any desired proportion. Preferred compositions fall between a ratio of 1 part of condensate to 3 parts of resin and a ratio of 3 parts of condensate to 1 part of resin. The optimum ratio will be determined by the intended purpose of the composition.

When the condensate is added in a high ratio to an aqueous solution of urea-formaldehyde resin, a turbid solution may be obtained. This turbidity may be clarified by the addition of a water-soluble alcohol such as methanol. Films obtained by evaporating the alcohol and water are remarkably clear which is indicative of the complete compatibility of the condensates with urea-formaldehyde resins.

A typical resinous condensate suitable for the purpose described herein may be obtained, for example, by heating phthalic anhydride with one mol equivalent of 2-nitro-2-methyl propanediol-1,3 at 140–145° C. until a transparent, pale yellow, viscous mass is obtained which is sticky and can be pulled out into threads. When one to two parts of this condensate are added to one part of a 40% solution of a condensate of 1 mol of urea and 2 mols of formaldehyde in water, and the resulting solution is clarified with a little methanol, a slightly syrupy solution results which may be used for coating metal, wood, paper, fabric, etc. After the solution has been applied to an object, the film is allowed to dry and is then cured. Curing may be completed in one-half to one hour at 130° C. The resulting film is transparent, colorless, strongly adhesive and very tough.

Maleic anhydride, succinic anhydride or other suitable resin-forming polycarboxylic acid or anhydride alone or in combination with monobasic acids may be used in place of the phthalic anhydride to yield analogous resinous condensation products of 2-nitro-2-methyl propanediol-1,3, which may also be similarly employed with urea-formaldehyde resins. The 2-nitro-2-methyl propanediol-1, 3 can be replaced mol for mol by other aliphatic nitropolyhydric alcohols such as trimethylol-nitro-methane, 2-nitro-2-ethyl propanediol-1,3, 3-nitro-3-methylpentane-diol-2,4 and the like to give analogous condensates. All of these may be employed for softening and plasticizing urea-formaldehyde resins, or other nitrogenous resins containing methylol groups.

In addition to the urea-formaldehyde resin shown in the above example there may be used urea-formaldehyde resins which are modified by the addition of thiourea, cyanamide, dicyanamide, melamine or the like. These substances, as is well known, react with formaldehyde under conditions similar to those employed in the production of urea resins. They are frequently used as modifiers in urea-formaldehyde resins. Such modified urea-formaldehyde resins are included in the general term "urea-formaldehyde resin" as herein used.

A unique advantage of the nitropolyhydric alcohol-polycarboxylic acid condensates is their miscibility in all proportions with aqueous solutions of urea-formaldehyde resin as well as their solubility in solutions of these resins in organic solvents. The solutions containing condensate and resin may be applied by dipping, spreading, or spraying. The resulting films are clear and continuous and may be cured by air-drying or baking. Suitable catalysts such as ammonium salts, acids, etc., may be incorporated in the solutions to facilitate setting of the resin. Concentrated solutions of condensate and resin may be used for castings. For molding preparations the new condensates may be mixed with a solution of a urea-formaldehyde type resin, a suitable filler such as a finely divided cellulose material added, and the solvent evaporated to yield a solid suitable for grinding to a molding powder. Coloring matter may also be incorporated with the filler.

The plasticized resins are also useful as adhesives and binders for wood, fabric, paper, cork, etc. The solutions of condensate and resin may be used for impregnating fabric, paper, wood, wallboard, or other porous materials, and, if desired, sheets of impregnated material may be laminated together by pressure and heat.

I claim:

1. A method of plasticizing nitrogenous resins containing methylol groups which comprises incorporating therewith a condensation product of an aliphatic nitropolyhydric alcohol and a resin-forming organic polycarboxylic acid.

2. A method of plasticizing nitrogenous resins containing methylol groups which comprises incorporating therewith a resinous condensation product of 2-nitro-2-methyl propanediol-1,3 and a polycarboxylic acid.

3. A method of plasticizing a urea-formaldehyde resin which comprises incorporating therewith a resinous condensation product of an aliphatic nitropolyhydric alcohol and a polycarboxylic acid.

4. A method of plasticizing a urea-formaldehyde resin which comprises incorporating therewith a resinous condensation product of 2-nitro-2-methyl propanediol-1,3 and phthalic anhydride.

5. A plasticized nitrogenous resin carrying a condensation product of an aliphatic nitropolyhydric alcohol and a resin-forming polycarboxylic acid.

6. A plasticized nitrogenous resin carrying a resinous condensation product of 2-nitro-2-methyl propanediol-1,3 and a polycarboxylic acid.

7. A plasticized urea-formaldehyde resin carrying a resinous condensation product of an aliphatic nitropolyhydric alcohol and a polycarboxylic acid.

8. A plasticized urea-formaldehyde resin carrying a resinous condensation product of 2-nitro-2-methyl propanediol-1,3 and phthalic anhydride.

9. A composition of matter comprising a carbamide-aldehyde resin and a condensation product of an aliphatic nitropolyhydric alcohol and a resin-forming polycarboxylic acid.

10. A composition of matter comprising a urea-formaldehyde resin and a resinous condensation product of 2-nitro-2-methyl propanediol-1,3 and phthalic anhydride.

HERMAN A. BRUSON.